United States Patent
Piirainen (12)

(10) Patent No.: US 6,724,841 B2
(45) Date of Patent: Apr. 20, 2004

(54) EQUALIZER WITH A COST FUNCTION TAKING INTO ACCOUNT NOISE ENERGY

(75) Inventor: Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 341 days.

(21) Appl. No.: 09/934,034

(22) Filed: Aug. 21, 2001

(65) Prior Publication Data

US 2002/0110205 A1 Aug. 15, 2002

Related U.S. Application Data

(63) Continuation of application No. PCT/EP99/10238, filed on Dec. 21, 1999.

(51) Int. Cl.$^7$ ................................................ H03D 1/04
(52) U.S. Cl. ................................... 375/346; 375/229
(58) Field of Search ...................... 375/240.02, 240.04, 375/240.05, 240.06, 240.07, 240.29, 229, 232, 233, 346, 254; 370/290, 286, 201; 708/322, 323

(56) References Cited

U.S. PATENT DOCUMENTS

| | | | |
|---|---|---|---|
| 5,692,011 A | | 11/1997 | Nobakht et al. |
| 5,694,424 A | * | 12/1997 | Ariyavisitakul ............. 375/233 |
| 5,694,437 A | * | 12/1997 | Yang et al. .................. 375/346 |
| 5,809,086 A | * | 9/1998 | Ariyavisitakul ............. 375/332 |
| 5,822,143 A | * | 10/1998 | Cloke et al. ................... 360/65 |
| 6,118,813 A | * | 9/2000 | Lai ............................. 375/231 |
| 6,122,015 A | * | 9/2000 | Al-Dhahir et al. ........... 348/614 |
| 6,151,358 A | * | 11/2000 | Lee et al. .................... 375/232 |
| 6,535,554 B1 | * | 3/2003 | Webster et al. ............. 375/233 |
| 6,618,701 B2 | * | 9/2003 | Piket et al. .................. 704/233 |

FOREIGN PATENT DOCUMENTS

EP 0880253 A2 11/1998

OTHER PUBLICATIONS

Yoshihiko Akaiwa; "Introduction To Mobile Communications", John Wiley & Sons, New York, USA, 1997, pp. 276–287.

Alexandra Duel–Hallen and Chris Heegard; "Delayed Decision–Feedback Sequence Estimation", IEEE Transactions on Communications, vol. 37, No. 5, May 1989.

M. Vedat Eyuboglu and Shahid U.H. Qureshi; "Reduced–State Sequence Estimation with Set Partitioning and Decision Feedback", IEEE Transactions On Communications, vol. 36, No. 1, Jan. 1988.

Naofal Al–Dhahir and John M. Cioffi; "MMSE Decision–Feedback Equalizers: Finite–Length Results", IEEE Transactions On Information Theory, vol. 41, No. 4, Jul. 1995, pp. 961–975.

Naofal Al–Dahir and John M. Cioffi; "Fast Computation of Channel–Estimate Based Equalizers in Packet Data Transmission", IEEE Transactions On Information Theory, vol. 43, No. 11, Nov. 1995, pp. 2462–2473.

International Search Report for PCT/EP99/10238.

\* cited by examiner

*Primary Examiner*—Emmanuel Bayard
(74) *Attorney, Agent, or Firm*—Squire, Sanders & Dempsey L.L.P.

(57) ABSTRACT

The present invention proposes a method for processing signals in order to remove waveform distortion by using an equalizer, said method comprising the steps of receiving an incoming signal, preprocessing said incoming signal, estimating a channel impulse response from said received signal estimating a noise energy from said received signal, calculating filter taps by using said estimated channel impulse response and said noise energy, filtering said received signal by using said calculated filter taps by a feedforward filter means, and supplying said received signal to an equalizer means which comprises a feedback filter, to obtain a resulting signal by a decision in said equalizer means, wherein said estimated channel impulse response is partitioned into at least two parts, in said calculating step of the filter taps one of said parts of said channel impulse response being used for calculating filter taps in said calculating step of the filter taps by using a weight function.

14 Claims, 3 Drawing Sheets

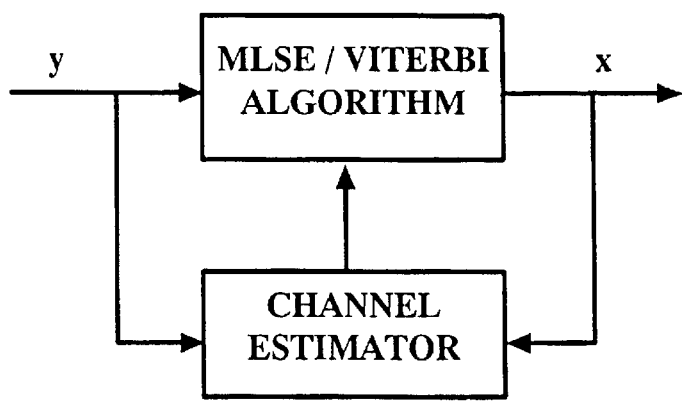
FIG. 3A (MLSE EQUALIZER)
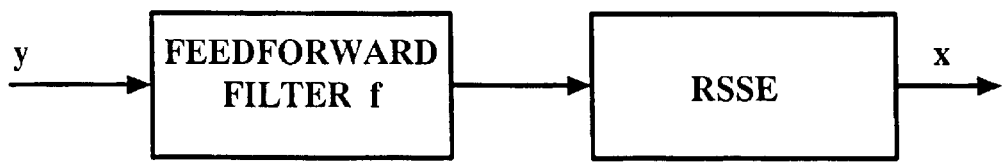
FIG. 3B (RSSE EQUALIZER)
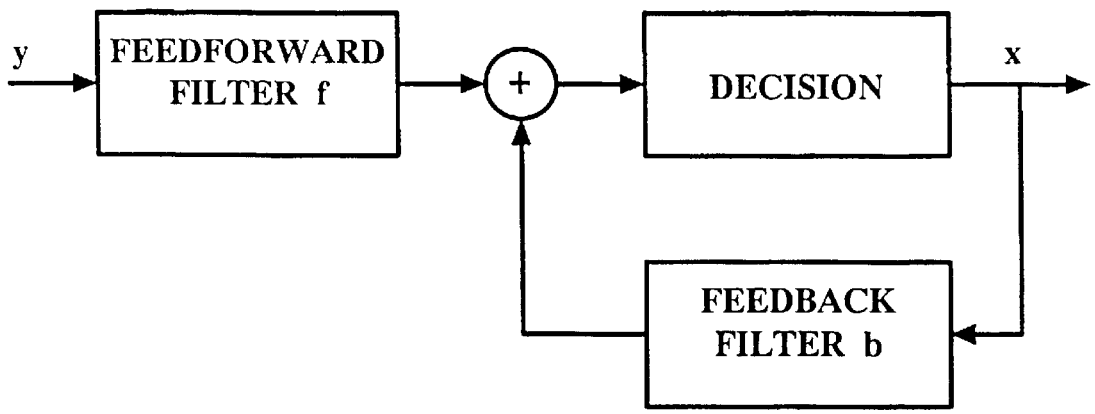
FIG. 3C (MMSE-DFE EQUALIZER)

EQUALIZER WITH A COST FUNCTION TAKING INTO ACCOUNT NOISE ENERGY

This application is a continuation of international application serial number PCT/EP99/10238, filed Dec. 21, 1999.

FIELD OF THE INVENTION

The present invention relates to a method for processing received signals in order to remove waveform distortion, and also to a corresponding device. In particular, the present invention is directed to a method and corresponding device used for improving an equalizer in a receiver part of digital telecommunication systems.

BACKGROUND OF THE INVENTION

In the last years, telecommunication systems and especially wireless telecommunication systems using digital data transmission methods are widely spreading. The usage of such digital data transmission methods allows to transmit data at a high transfer rate. In case of e.g. a mobile telecommunication system such as GSM (Global System for Mobile communications) it is possible to transmit speech or data between a stationary transceiver unit, i.e. a base station, and a terminal device, such as a mobile station, in a circuit switched mode as well as in a packet data mode. Further developments such as HSCSD (High Speed Circuit Switched Data), GPRS (General Packet Radio Service), EDGE (Enhanced Data Rates for GSM Evolution) and the like provide more sophisticated data transmission performance.

However, on the receiving side (i.e. the mobile station or the base station), the incoming signals received for example via an antenna suffer from waveform distortion caused for example by multipath propagation. Such waveform distortion like intersymbol interference and additive noise makes it more difficult for the receiving side to assign, identify and reconstruct the received signals (i.e. the symbols) correctly, since a mixture of signals is received with different delay times and amplitudes. In particular in high speed digital data transmissions, this is problematic.

To remove waveform distortions, in telecommunication systems, the usage of equalizers at the receiving side is commonly known. In said equalizers, on the basis of e.g. a channel impulse response, a decision is made how the incoming signals are to be interpreted, i.e. how the symbols are to be detected from said mixture of received signals.

Hitherto, several solutions for different types of equalizers are known to be usable in telecommunication systems. Some of them are for example described in "Introduction To Mobile Communication" by Y. Akaiwa, pages 276 to 287, John Wiley & Sons, New York, USA, 1997, in "Delayed decision Feedback Sequence Estimation" by A. Duel Hallen and C. Heegard, IEEE Transactions on Communications, vol. 37, no. 5, May 1989, in "Reduced-State Sequence Estimation With Set Partitioning And Decision Feedback" by M. Vedat Eyuboglu and Shahit U. H. Qureshi, IEEE Transactions on Communications, vol. 36, no. 1, January 1988, in "MMSE Decision Feedback Equalizers: Finite-Length Results" by N. Al-Dahir and John M. Cioffi, IEEE Transactions on Information Theory, vol. 41, no. 4, pages 961–975, July 1995, and in "Fast Computation Of Channel Estimate Based Equalizers In Packet Data Transmission" by N. Al-Dahir and John M. Cioffi, IEEE Transactions on Information Theory, vol. 43, no. 11, pages 2462–2473, November 1995.

The main purpose of such an equalizer is to reconstruct the received signal in such manner that it is as similar as possible to the original signal. This can be achieved for example by estimating the channel impulse response and use it to reconstruct the received signal. In general, it is possible to use a known training pattern (i.e. a training sequence) included for example in each sent data packet to estimate the channel impulse response at the receiving side. Then, settings for the equalizers (i.e. of equalizer or filter taps) can be computed. For a good performance, the duration of the training sequence has to be short.

One proposed solution for an equalizer is a maximum-likelihood sequence estimation (MLSE) using a trellis-based Viterbi algorithm. A simplified structure of such an equalizer is shown in FIG. 3A. Further to the MLSE part, a channel estimator for estimating a time-varying channel impulse response is required. In general, the MLSE equalizer shows almost optimal detection performance. However, particularly in multilevel modulation system, this method becomes unpractical for use since its complexity is proportional to the number of states in trellis which increase significantly when multilevel modulation is used. For example, in case of an 8PSK (8 level phase shift keying) modulation and in a possible environment where 5 to 6 taps may be used, the number of states is several thousands. Therefore, the complexity of such MLSE equalizers increases to such an extent that present implementations for mobile station or base station equalizers are not able to manage it, or the costs of such an equalizer would not be economical.

In order to get a less complex equalizer, though with less optimal performance, there are given several other solutions in the prior art. In one of said solutions a reduced-state sequence estimation (RSSE) is used. This method is similar to the above described MLSE and is also based on the Viterbi algorithm. However, in comparison to the MLSE, the RSSE uses trellises with a reduced number of states, which leads to a less complex operation. The principle structure is shown in FIG. 3B. Here, a feedforward filter is additionally used by which a channel impulse response is shaped to a minimum phase.

It is also known to equalize incoming signals by using a decision feedback equalizer (DFE). In this case, only a part of the impulse response is "open for decision" in the equalizer. By feeding back results of decisions of the signals, the energy of the rest of the taps (which are "not open for decision") of the equalizer can be reduced. In general, the effective signal energy and therefore the effective signal-to-noise ratio (SNR) is defined by the energy in those impulse response taps which are "open for decision" in the trellis. A method for maximizing this energy portion is to pre-filter the incoming signals by which the channel impulse response is shaped to a minimum phase. This will maximize the effective SNR for signal detection, i.e. for the decision.

The principle structure of such a DFE is shown in FIG. 3C. Here, also after passing the incoming signal through a feedforward filter which shapes the channel impulse response to the minimum phase, the filtered signal is fed to a decision part in which a decision about the signal (or symbol) is made. Then, the decided output of the decision part is fed back via a feedback filter for eliminating the effect (e.g. an intersymbol interference) of previously detected (i.e. decided) symbols on the decision of the current (next) symbol or signal.

For the filters, in the DFE, as well as in the above described RSSE case, most preferably finite impulse response (FIR) filters are used. Such FIR filters exhibit good numerical properties and lend themselves to an easy adaptive implementation.

As a performance criterion in the DFE, for example, a minimum mean square error (MMSE) can be used, which results in a so-called MMSE-DFE equalizer. The MMSE criterion (or cost function) can be written as $$J=E|x_i-yf-xb|^2, \quad (1)$$

wherein J is the MMSE criterion (or the cost function result), E indicates an expectation value, $x_i$ is a data symbol (incoming signal) currently to be estimated, y is a vector containing the received signals or samples, f is a column vector containing feedforward filter taps, x is a data symbol vector containing symbols decided before $x_i$, and b is a column vector containing feedback filter taps.

In the MMSE-DFE equalizer, J has to be minimized with respect to f and b. Now, the taps for the feedforward and feedback filters can be calculated, as for example described in the references mentioned above.

However, the above described solutions suffer from several drawbacks. As mentioned above, the MLSE leads to complex calculations or equalizer structures which make it not useful for e.g. multilevel modulation systems. Though the RSSE and MMSE-DFE solutions are easier to implement, here another problem occurs. For example, in the MMSE-DFE, it is assumed, in the MMSE criterion J, that the decision made before the current decision (i.e. the feedback decision) is correct. As can be seen, for example, in the above mentioned references, this assumption is not true, but nevertheless it is used. The basic problem therewith is that symbol errors occur in the equalizer output. This error propagates in the following decisions, and it is easy to understand that the performance of the equalizer is corrupted. This is especially problematic in cases, where a long delay profile in the channel is present, for example in so-called hilly terrain channels.

SUMMARY OF THE INVENTION

Therefore, it is an object of the present invention to provide a method for processing incoming signals at a receiving side of a telecommunication system in order to remove waveform distortion, said method being applicable in particular to systems using a multilevel modulation and providing an improved error performance, and also a corresponding device.

According to the present invention, this object is achieved by a method for processing signals in order to remove waveform distortion by using an equalizer, said method comprising the steps of receiving an incoming signal, preprocessing said incoming signal, estimating a channel impulse response from said received signal, estimating a noise energy from said received signal, calculating filter taps by using said estimated channel impulse response and said noise energy, filtering said received signal by using said calculated filter taps by a feedforward filter means, and supplying said received signal to an equalizer means which comprises a feedback filter, to obtain a resulting signal by a decision in said equalizer means, wherein said estimated channel impulse response is partitioned into at least two parts, in said calculating step of the filter taps one of said parts of said channel impulse response being used for calculating filter taps in said calculating step of the filter taps by using a weight function having the form of $$f(h,\delta^2,A)b_{dfe}{}^H b_{dfe},$$

whereby a cost function of said equalizer is formed as $$J=E|x_i-yf-xb|^2+f(h,\delta^2,A)b_{dfe}{}^H b_{dfe},$$

wherein J is a cost function result, E indicates an expectation value, $x_i$ is a data symbol of the signal currently to be estimated, y is a vector containing the received signal, f is a column vector containing taps of said feedforward filter, x is a vector containing data symbols decided on previously to $x_i$, b is a column vector containing taps of said feedback filter, $f(h,\delta^2,A)$ is a function estimating an expected squared error vector with A as a user definable constant and the operator H indicates a complex-conjugate transpose of a matrix or a vector.

Furthermore, the present invention proposes a device for processing signals in order to remove waveform distortion by using an equalizer, said device comprising receiving means for receiving and preprocessing an incoming signal, means for estimating a channel impulse response from said received signal, means for estimating a noise energy from said received signal, means for calculating filter taps by using said estimated channel impulse response and said noise energy, feedforward filter means, the filter taps of which are calculated by said means for calculating filter taps, and an equalizer means which comprises a feedback filter, the filter taps of which are calculated by said means for calculating filter taps, said received signal being supplied to the equalizer means via said feedforward filter means to obtain a resulting signal by a decision in said equalizer means, wherein said estimated channel impulse response is partitioned into at least two parts, said means for calculating filter taps using one of said parts of said channel impulse response for calculating filter taps by using a weight function having the form of $$f(h,\delta^2,A)b_{dfe}{}^H b_{dfe},$$

whereby a cost function of said equalizer is formed as $$J=E|x_i-yf-xb|^2+f(h,\delta^2,A)b_{dfe}{}^H b_{dfe},$$

wherein J is a cost function result, E indicates an expectation value, $x_i$ is a data symbol of the signal currently to be estimated, y is a vector containing the received signal, f is a column vector containing taps of said feedforward filter, x is a vector containing data symbols decided on previously to $x_i$, b is a column vector containing taps of said feedback filter, $f(h,\delta^2,A)$ is a function estimating an expected squared error vector with A as a user definable constant and the operator H indicates a complex-conjugate transpose of a matrix or a vector.

Advantageous further developments of the present invention are as set out in the respective dependent claims.

According to the present invention, the proposed method and/or device provide an improved error correction performance by using a weight function to consider bit errors or symbol errors at the equalizer output thereby inhibiting an error propagation and a corruption of the system. It is obvious that this may be done in every receiving part of the respective communication network, e.g. in a receiving terminal device (mobile station) or base station.

To obtain an output signal (i.e. a decided signal), the received signal is fed to a feedforward filter, the filter taps of which are calculated by said means for calculating filter taps, and then to an equalizer which comprises a feedback filter, the filter taps of which are also calculated by said means for calculating filter taps.

The method and/or device according to the present invention are most preferably used in MMSE-DFE equalizer systems, but they may also be applicable to other equalizer systems. With reference to FIG. 1, the general concept of the invention is described in combination for example with the above mentioned MMSE-DFE equalizer, wherein the used filters (feedforward filter and feedback filter in the equalizer) may be finite impulse response (FIR) filters. The feedforward filter f is placed before the equalizer for shaping the impulse response to minimum phase.

In the equalizer, one part of the impulse response is "open for decision" in trellis, while the other part of the impulse response is used at the decisions (i.e. in the decision part, see e.g. FIG. 3C). These decisions, which relate to this second part of the impulse response, are fed back via the feedback filter. The partitioned channel impulse response can be represented by:

$$h'=[1, b_{\mathit{ff}}, b_{\mathit{dfe}}], \quad (2)$$

wherein $b_{\mathit{ff}}$ is the part of the impulse response which is "open for decision" in trellis and used in the feedforward filter means, and $b_{\mathit{dfe}}$ is the part of the impulse response relating to taps of the feedback filter which are used for the decision in the decision part.

Now, a weight function can be formed which considers the bit errors occurring in the decision. These bit errors add the square error proportional to the energy of each decision feedback tap. The other part of the impulse response ("open for decision") has no effect. This weight function has the form of $$f(h, \delta^2, A) b_{\mathit{dfe}}{}^H b_{\mathit{dfe}},$$

wherein $f(h, \delta^2, A)$ is a function estimating an expected squared error vector with h as the impulse response, $\delta^2$ as a noise and interference energy estimate and A as a user definable constant, $b_{\mathit{dfe}}$ is the part of the impulse response relating to the taps which are used for the decision and which are fed back, and the operator H indicates a complex-conjugate transpose of a matrix or a vector.

In the means for calculating the filter taps, a modified cost function or MMSE criterion (in comparison to equation (1)) can be formed, in which the weight function is considered (i.e. the bit error rate is taken into account):

$$J = E|x_i - yf - xb|^2 + f(h, \delta^2, A) b_{\mathit{dfe}}{}^H b_{\mathit{dfe}}. \quad (3)$$

For estimating the channel impulse response, a known training sequence, as commonly known in the prior art, is sent preferably in every burst of incoming signals. The training sequence contains predefined known data values which can be used for the estimation.

A further advantage of the present invention is that it is easy to implement since only small modifications have to be done. Moreover, an implementation of the present invention leads to computations, the complexity of which is significantly lower than in the above described MLSE case and similar to the original MMSE-DFE case. This can be seen easily for example in the calculation of the filter taps, e.g. of the feedforward filter taps:

$$f = (E(y^*y^t) - E(y^*y^t)TE(x^*y^t))^{-1} E(y^*x_i), \quad (4)$$

wherein the operator * indicates a conjugate complex of a matrix or a vector, the operator t indicates a transpose of a matrix or a vector, and T is a matrix of the form $$T = \begin{bmatrix} 1 & \ldots & 0 & 0 \\ \ldots & 1 & 0 & 0 \\ 0 & 0 & 1+f(h, \delta^2, A) & 0 \\ 0 & 0 & 0 & 1+f(h, \delta^2, A) \end{bmatrix}, \quad (5)$$

wherein the size of this matrix T is defined by the length of the impulse response part $b_{\mathit{dfe}}$. When replacing said matrix T for example by the unit matrix, the calculation of filter taps as in an original MMSE-DFE case will be achieved. Therefore, it is obvious that there is only a negligible increase of complexity.

Advantageously, also a user definable setting of amounts of the partitioned parts of the impulse response, i.e. $b_{\mathit{ff}}$, $b_{\mathit{dfe}}$, is possible. This can be done according to the desired complexity and/or performance of the equalizer device. As mentioned above, the complexity of calculations can be adjusted for example by the size of the matrix T in equation (5), which depends on the length of $b_{\mathit{dfe}}$.

According to the present invention, a solution is provided for solving problems occurring in signal transmissions at the receiving side wherein channels with a long delay profile are used, such as the above mentioned hilly terrain channels (HT) or bad urban terrain channels (TU). By using the present invention, at transmissions over long delay channels, it is possible to achieve a significant performance gain, for example in the resulting bit error rate, in comparison to the prior art. This may be also supported when the used feedforward filter is of a short length.

A preferred embodiment of the invention is described herein below in detail by way of example with reference to the accompanying drawings.

BRIEF DESCRIPTION OF THE DRAWINGS

FIGS. 3A, 3B and 3C are block circuit diagrams illustrating common equalizers structures.

DESCRIPTION OF A PREFERRED EMBODIMENT

A preferred application field for the present invention is for example in a communication system using EDGE, in particular if there are channels with long delay profiles such as hilly terrain channels (HT) or bad urban terrain channels (TU).

Figure 1:
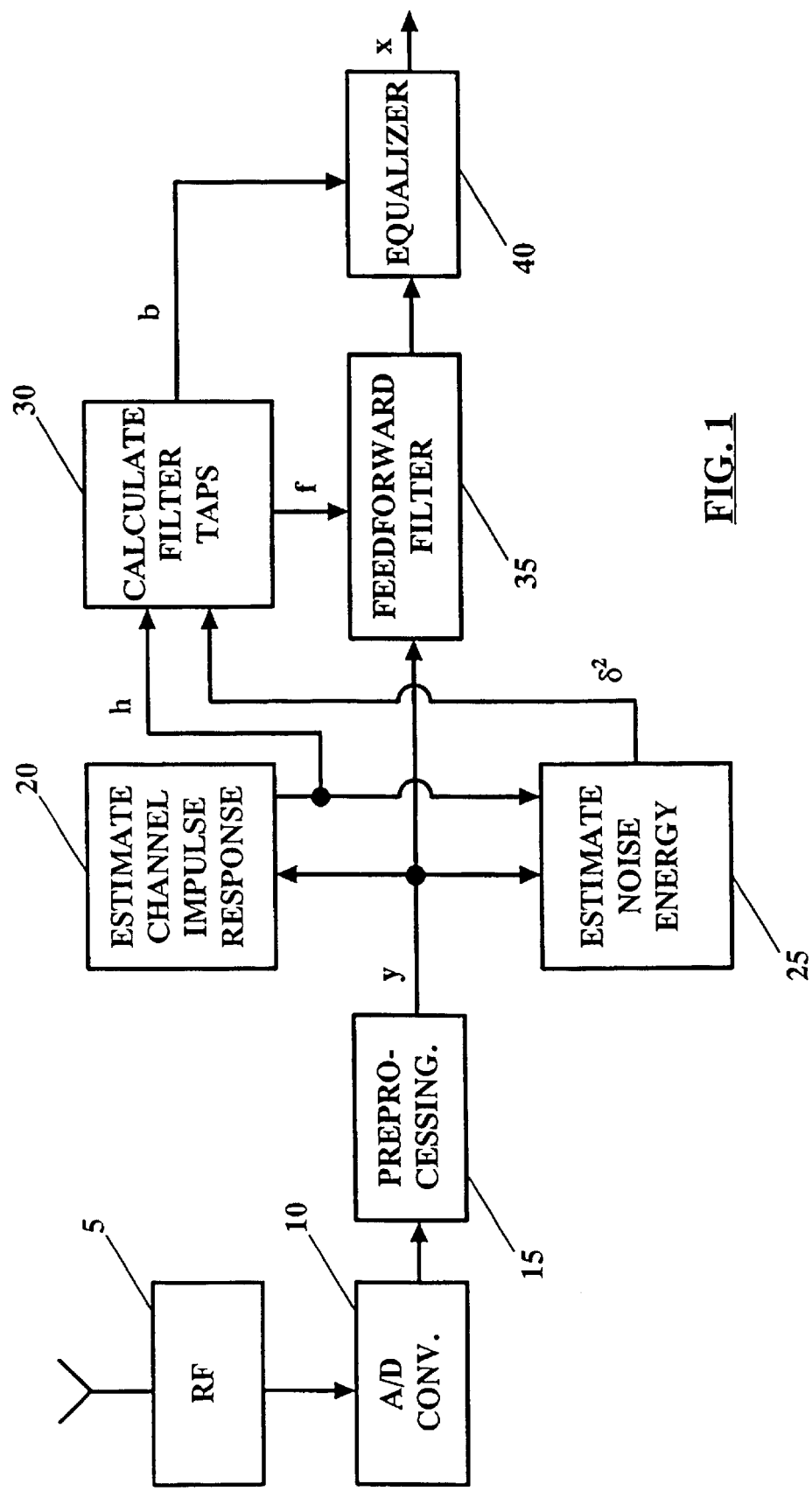
FIG. 1 is a block circuit diagram showing a device according to the invention.

In FIG. 1, as one embodiment, an equalizer device according to the present invention is shown in combination with e.g. a MMSE-DFE equalizer. It is to be noted, that this block circuit diagram shows only a simplified case. Other parameters, such as channel noise and the like commonly known to persons skilled in the art, may also influence the system and can be reflected.

In FIG. 1, reference numeral 5 denotes an RF receiving part including an antenna, reference numeral 10 an analog-to-digital converter, and reference numeral 15 a preprocessing unit. Furthermore, reference numeral 20 denotes means for estimating a channel impulse response, reference numeral 25 means for estimating a noise energy, and reference numeral 30 means for calculating filter tabs. Reference numeral 35 denotes a feedforward filter, and reference numeral 40 denotes an equalizer unit.

An incoming signal, transmitted for example in an EDGE transmission, is received at the RF receiving part 5. The signal is then supplied to the analog-to-digital converter 10 for bringing the received signal from an analog form into a digital form. Then, after passing the preprocessing unit 15, a signal y is obtained which is to be identified.

Since, during the transmission, the signal is subjected to waveform distortion, for example due to a multipath propagation, it has to be equalized.

For an improved equalization according to the present invention, the channel impulse response h as well as the noise energy $\delta^2$ have to be estimated. This is executed by the means 20 for estimating the channel impulse response and the means 25 for estimating the noise energy, respectively. For this purpose, a known training sequence is used which is included for example in every burst of the incoming signals. The data pattern of said sequence is the compared with the received pattern to estimate the channel impulse response. The actual estimation can for example be performed by using a least square estimation (LSE). The estimated channel impulse response is then used for the estimation in the means 25 for estimating the noise energy.

The estimated channel impulse response h and noise energy $\delta^2$ are supplied to the means 30 for calculating the filter taps b, f for the filters used in the actual equalization. In said means 30, a weight function is used for considering bit errors or symbol errors which may occur in a resulting output, which would be fed back for the decision of a succeeding signal (i.e. symbol) and therefore corrupt the equalization.

For the calculation in said means 30, a partitioned form of the estimated channel impulse response h is used which is shown in equation (2). One part, $b_{fp}$, relates to the part of the impulse response which is "open for decision" in trellis. The other part, $b_{dfe}$, relates to the part of the impulse response relating to taps which are used for the decision in the equalizer unit 40. By using the part $b_{dfe}$ and a function which relates the square error, the means 30 is able to process the signal so that a cost function for a MMSE-DFE equalizer according to the present invention can be formed according to equation (3).

The feedforward filter 35 shapes the channel impulse response to minimum phase, as described above. In the decision part of the equalizer unit 40 (see e.g. FIG. 3C), a decision is made which actual value the received signal (i.e. symbol) has. Hence, the detected (i.e. decided) symbol x is output.

Figure 2:
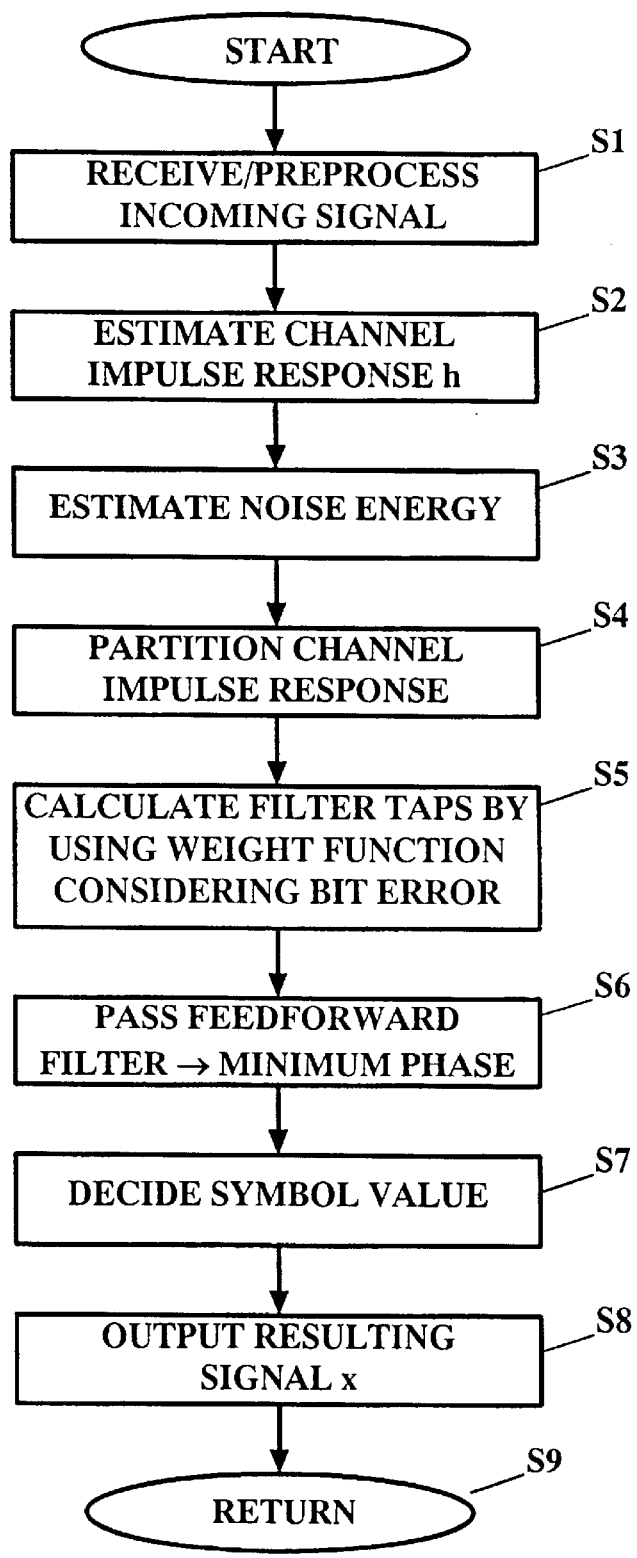
FIG. 2 is a flowchart illustrating a procedure according to the present invention.

With reference to FIG. 2, a flowchart diagram is described, in which an equalizing procedure by using a method according to the present invention is illustrated.

In step S1, the incoming signal containing the symbols to be detected is received and preprocessed. Thereafter, in step S2, the channel impulse response h is estimated on basis of said training sequence, as described above. Also, the noise energy level ($\delta^2$) is estimated (step S3) by using the estimated channel impulse response h.

In step S4, the obtained channel impulse response h is partitioned ($b_{fp}$, $b_{dfe}$). Although, in the flow chart in FIG. 2, this partitioning is indicated to be done subsequent to the estimation of the channel impulse response, it is to be noted, that the actual partitioning, i.e. the setting of the lengths of the at least two parts $b_{fp}$, $b_{dfe}$ is already done in advance, for example during design of the equalizer unit.

In step S5, the filter taps of the feedforward filter 35 and the feedback filter in the equalizer unit 40 are calculated on the basis of the estimated channel impulse response and noise energy. This calculation is performed by using a weight function in the form of $$f(h,\delta^2,A)b_{dfe}{}^H b_{dfe},$$

as described above, which is used to form a modified MMSE-criterion (cost function) according to the invention which is shown in equation (3). Hence, a possible bit error at the equalizer output can be considered.

In step S6, the signal y is fed to the feedforward filter 35 which shapes the impulse response to minimum phase (step S2). In step S7, on the basis of the above described steps, it is decided which value the signal y (i.e. the symbol) has. A resulting signal x of the decision in step S7 is output in step S8 for further processing steps in the communication system such as speech codec and the like (not shown), and the process returns for a next signal to be decided (step S9). It is to be noted that the last decided signal x is used for the next signal to be decided $x_i$, i.e. it is fed back.

As an example for an operation of the present invention, the following equation for the function $f$ estimating the expected square error may be used:

$$f(h, \delta^2, A) = A \frac{\delta^2}{|h|^2}. \tag{6}$$

However, there are also various other possibilities for this function.

By using the equations (2) to (6), it has been shown, that a gain for example in an obtained block error rate (BLER) and/or bit error rate (BER), respectively, of up to 1 dB in a carrier-to-interference ratio can be achieved in comparison to the prior art (i.e. to an common MMSE-DFE equalizer in an EDGE transmission). As mentioned above, this gain is as higher as larger the delay profile is.

According to the above description, the present invention proposes a method for processing signals in order to remove waveform distortion by using an equalizer, said method comprising the steps of receiving an incoming signal, preprocessing said incoming signal, estimating a channel impulse response from said received signal, estimating a noise energy from said received signal, calculating filter taps by using said estimated channel impulse response and said noise energy, filtering said received signal by using said calculated filter taps by a feedforward filter means, and supplying said received signal to an equalizer means which comprises a feedback filter, to obtain a resulting signal by a decision in said equalizer means, wherein said estimated channel impulse response is partitioned into at least two parts, in said calculating step of the filter taps one of said parts of said channel impulse response being used for calculating filter taps in said calculating step of the filter taps by using a weight function having the form of $$f(h,\delta^2,A)b_{dfe}{}^H b_{dfe},$$

whereby a cost function of said equalizer is formed as $$J=E|x_i-yf-xb|^2+f(h,\delta^2,A)b_{dfe}{}^H b_{dfe},$$

wherein J is a cost function result, E indicates an expectation value, $x_i$ is a data symbol of the signal currently to be estimated, y is a vector containing the received signal, f is a column vector containing taps of said feedforward filter, x is a vector containing data symbols decided on previously to $x_i$, b is a column vector containing taps of said feedback filter, $f(h,\delta^2,A)$ is a function estimating an expected squared error vector with A as a user definable constant and the operator H indicates a complex-conjugate transpose of a matrix or a vector. The present invention proposes also a corresponding device.

It should be understood that the above description and accompanying figures are merely intended to illustrate the present invention by way of example only. The preferred embodiments of the present invention may thus vary within the scope of the attached claims.

What is claimed is:

1. A method for processing signals in order to remove waveform distortion by using an equalizer, said method comprising the steps of:

receiving (S1) an incoming signal (y);

preprocessing (S1) said incoming signal (y);

estimating (S2) a channel impulse response (h) from said received signal (y);

estimating (S3) a noise energy ($\delta^2$) from said received signal (y);

calculating (S5) filter taps (f, b) by using said estimated channel impulse response (h) and said noise energy ($\delta^2$);

filtering (S6) said received signal by using said calculated filter taps by a feedforward filter means (35), and supplying said received signal to an equalizer means (40) which comprises a feedback filter, to obtain a resulting signal (x) by a decision (S7) in said equalizer means; wherein said estimated channel impulse response is partitioned (S4) into at least two parts ($b_{ff}$, $b_{dfe}$), in said calculating step (S5) of the filter taps one of said parts ($b_{dfe}$) of said channel impulse response being used for calculating filter taps in said calculating step (S5) of the filter taps by using a weight function having the form of $f(h,\delta^2,A)b_{dfe}{}^H b_{dfe}$, whereby a cost function of said equalizer is formed as $J=E|x_i-yf-xb|^2+f(h,\delta^2,A)b_{dfe}{}^H b_{dfe}$, wherein J is a cost function result, E indicates an expectation value, $x_i$ is a data symbol of the signal currently to be estimated, y is a vector containing the received signal, f is a column vector containing taps of said feedforward filter, x is a vector containing data symbols decided on previously to $x_i$, b is a column vector containing taps of said feedback filter, $f(h,\delta^2,A)$ is a function estimating an expected squared error vector with A as a user definable constant and the operator H indicates a complex-conjugate transpose of a matrix or a vector.

2. A method according to claim 1, wherein
   for said estimating step (S2) of the channel impulse response (h) a known training sequence is used which is included in at least one burst of the received signal (y).

3. A method according to claim 1, wherein
   a first part ($b_{ff}$) of the partitioned channel impulse response relates to taps (b) of the feedback filter in the equalizer means (40), which are open for decision, and
   a second part ($b_{dfe}$) of the channel impulse response relates to taps of the feedback filter which are used for said decision.

4. A method according to claim 1, wherein taps (f) of said feedforward filter (35) are calculated according to $f=(E(y^*y^t)-E(y^*y^t)TE(x^*y^t))^{-1}E(y^*x_i)$, wherein the operator * indicates a conjugate complex vector or matrix, the operator t indicates a transpose of a matrix or a vector, and T is a matrix of the form $$T = \begin{bmatrix} 1 & \cdots & 0 & 0 \\ \cdots & 1 & 0 & 0 \\ 0 & 0 & 1+f(h,\delta^2,A) & 0 \\ 0 & 0 & 0 & 1+f(h,\delta^2,A) \end{bmatrix},$$

wherein the size of said matrix T is defined by the length of said partitioned second part ($b_{dfe}$) of the channel impulse response (h).

5. A method according to claim 1, wherein said equalizer means (40) is a minimum mean square error decision feedback equalizer.

6. A method according to claim 1, wherein said feedforward and said feedback filters are finite impulse response filters.

7. A method according to claim 6, wherein said feedforward filter (35) is used to shape the impulse response (h) to minimum phase.

8. A device for processing signals in order to remove waveform distortion by using an equalizer, said device comprising:

receiving means (5, 10, 15) for receiving and preprocessing an incoming signal (y);

means (20) for estimating a channel impulse response (h) from said received signal (y);

means (25) for estimating a noise energy ($\delta^2$) from said received signal (y);

means (30) for calculating filter taps (f, b) by using said estimated channel impulse response (h) and said noise energy ($\delta^2$);

feedforward filter means (35), the filter taps (f) of which are calculated by said means (30) for calculating filter taps; and an equalizer means (40) which comprises a feedback filter, the filter taps (b) of which are calculated by said means (30) for calculating filter taps, said received signal (y) being supplied to the equalizer means (40) via said feedforward filter means (35) to obtain a resulting signal (x) by a decision in said equalizer means;

wherein said estimated channel impulse response is partitioned into at least two parts ($b_{ff}$, $b_{dfe}$), said means (30) for calculating filter taps using one of said parts ($b_{dfe}$) of said channel impulse response for calculating filter taps by using a weight function having the form of $f(h,\delta^2,A)b_{dfe}{}^H b_{dfe}$, whereby a cost function of said equalizer is formed as $J=E|x_i-yf-xb|^2+f(h,\delta^2,A)b_{dfe}{}^H b_{dfe}$, wherein J is a cost function result, E indicates an expectation value, $x_i$ is a data symbol of the signal currently to be estimated, y is a vector containing the received signal, f is a column vector containing taps of said feedforward filter, x is a vector containing data symbols decided on previously to $x_i$, b is a column vector containing taps of said feedback filter, $f(h,\delta^2,A)$ is a function estimating an expected squared error vector with A as a user definable constant and the operator H indicates a complex-conjugate transpose of a matrix or a vector.

9. A device according to claim 8, wherein
said means (20) for estimating the channel impulse response estimates said channel impulse response (h) by using a known training sequence included in at least one burst of the received signal (y).

10. A device according to claim 8, wherein
a first part ($b_{ff}$) of the partitioned channel impulse response relates to taps (b) of the feedback filter in the equalizer means (40), which are open for decision, and
a second part ($b_{dfe}$) of the channel impulse response relates to taps of the feedback filter which are used for said decision.

11. A device according to claim 8, wherein taps (f) of said feedforward filter (35) are calculated according-to $$f=(E(y^*y^t)-E(y^*y^t)TE(x^*y^t))^-E(y^*x_i),$$

wherein the operator * indicates a conjugate complex vector or matrix, the operator t indicates a transpose of a matrix or a vector, and T is a matrix of the form $$T = \begin{bmatrix} 1 & \cdots & 0 & 0 \\ \cdots & 1 & 0 & 0 \\ 0 & 0 & 1+f(h,\delta^2,A) & 0 \\ 0 & 0 & 0 & 1+f(h,\delta^2,A) \end{bmatrix},$$

wherein the size of said matrix T is defined by the length of said partitioned second part ($b_{dfe}$) of the channel impulse response (h).

12. A device according to claim 8, wherein said equalizer means (40) is a minimum mean square error decision feedback equalizer.

13. A device according to claim 8, wherein said feedforward and said feedback filters are finite impulse response filters.

14. A device according to claim 13, wherein said feedforward filter (35) is used to shape the impulse response (h) to minimum phase.

* * * * *